(12) United States Patent
Vanham et al.

(10) Patent No.: US 11,663,589 B2
(45) Date of Patent: May 30, 2023

(54) LONG-TERM OFFLINE MANAGEMENT OF CRYPTOGRAPHIC PARAMETERS

(71) Applicant: Ngrave.IO NV, Zonhoven (BE)

(72) Inventors: Edouard Vanham, Zonhoven (BE); Ruben Merre, Zonhoven (BE); Xavier Hendrickx, Zonhoven (BE); Jeroen Meybosch, Zonhoven (BE)

(73) Assignee: NGRAVE NV, Antwerp (BE)

( * ) Notice: Subject to any disclaimer, the term of this patent is extended or adjusted under 35 U.S.C. 154(b) by 339 days.

(21) Appl. No.: 16/745,548

(22) Filed: Jan. 17, 2020

(65) Prior Publication Data

US 2020/0234296 A1    Jul. 23, 2020

(30) Foreign Application Priority Data

Jan. 21, 2019  (EP) ..................................... 19152885

(51) Int. Cl.
*G09C 1/00* (2006.01)
*G09C 1/02* (2006.01)
*G09C 1/04* (2006.01)
*G09C 1/14* (2006.01)
*G06Q 20/38* (2012.01)
(Continued)

(52) U.S. Cl.
CPC ......... *G06Q 20/3829* (2013.01); *B42D 25/29* (2014.10); *G06F 12/1408* (2013.01);
(Continued)

(58) Field of Classification Search
CPC ... G09C 1/00; G09C 1/02; G09C 1/04; G09C 1/14; G09C 5/00; A63F 2003/0431
(Continued)

(56) References Cited

U.S. PATENT DOCUMENTS

| 3,060,782 | A |   | 9/1959 | Burgess |            |
|-----------|---|---|--------|---------|------------|
| 4,885,459 | A | * | 12/1989| Norsworthy | ........... G06K 1/125 |
|           |   |   |        |         | 283/73     |

(Continued)

FOREIGN PATENT DOCUMENTS

| DE | 102008053219 A1 | * | 8/2009 | ............... G09C 1/14 |
| DE | 102008053219 A1 |   | 8/2009 | |

(Continued)

*Primary Examiner* — Kyle R Grabowski
(74) *Attorney, Agent, or Firm* — Cermak Nakajima & McGowan LLP; James Creighton Wray (57) ABSTRACT

A method for the interception-proof transmission of at least one cryptographic parameter from a user to an encrypted offline storage medium, comprising steps of: cloaking an upward portion of a substrate with an upper plate, characterized in that said upper plate comprises a multitude of indicia, wherein each indicium has a corresponding manipulation indicator; sequentially positioning a manipulation apparatus over one or more of the manipulation indicators; mechanically manipulating the substrate, after each sequential positioning of the manipulation apparatus, using said manipulation apparatus, characterized in that the manipulation indicator of the desired indicium overlaps with one mechanical manipulation unit of the substrate; and deconstructing said substrate in two or more complementary units, characterized in that said complementary units each comprises at least one mechanical manipulation unit administered by the manipulation apparatus.

11 Claims, 4 Drawing Sheets

(51) Int. Cl.
*G06Q 20/06* (2012.01)
*G06F 12/14* (2006.01)
*B42D 25/29* (2014.01)
*G09C 5/00* (2006.01)
*A63F 3/04* (2006.01)

(52) U.S. Cl.
CPC ............. *G06Q 20/065* (2013.01); *G09C 1/00* (2013.01); *G09C 1/02* (2013.01); *G09C 1/04* (2013.01); *G09C 1/14* (2013.01); *G09C 5/00* (2013.01); *A63F 2003/0431* (2013.01)

(58) Field of Classification Search
USPC ........................................ 283/73; 380/54–56
See application file for complete search history.

(56) References Cited

U.S. PATENT DOCUMENTS

| 5,056,142 | A | * | 10/1991 | Lapointe | ................. | G09C 1/04 |
| | | | | | | 380/54 |
| 5,307,414 | A | * | 4/1994 | Roth | ........................ | G09C 1/04 |
| | | | | | | 283/17 |

FOREIGN PATENT DOCUMENTS

| EP | 546681 | A1 | * | 6/1993 | ................ | G06C 3/00 |
| EP | 1840778 | A1 | * | 10/2007 | .............. | G06F 21/34 |
| GB | 191406607 | A | * | 3/1914 | | |
| GB | 1459442 | A | * | 12/1976 | ........... | A63F 9/0098 |
| GB | 1459442 | A | | 12/1976 | | |
| GB | 2429576 | A | * | 2/2007 | ................ | G09C 1/04 |

* cited by examiner

LONG-TERM OFFLINE MANAGEMENT OF CRYPTOGRAPHIC PARAMETERS

This application claims the benefit of European Application No. EP19152885.0 filed Jan. 21, 2020.

FIELD OF THE INVENTION

The present invention relates to a method, a system, and an apparatus for the secure long-term storage of cryptographic parameters. In particular, the current invention relates to the secure long-term storage of a cryptographic key pair.

BACKGROUND

The Bitcoin network and other cryptocurrency networks are peer-to-peer payment systems having a plurality of nodes that are connected to one another. Bitcoin exchange computer systems allow for users to exchange local currency into or out of bitcoin. Users send payments by broadcasting digitally signed messages to the Bitcoin network. Users may, for example, send and receive payments using mobile applications on mobile devices, client software or a web browser.

Transactions do not explicitly identify both parties by name or wallet. Instead, a bitcoin transaction transfers ownership to a new address, referred to as a "Bitcoin address". The Bitcoin address is derived from the public portion of one or more cryptographic key pairs. The private portion of a key pair is not disclosed to the public. To send bitcoin to an address, a user broadcasts a payment message that is digitally signed with the associated private key.

Participants known as "miners", verify and timestamp transactions into a shared public database called a "block chain". The miners are rewarded with transaction fees and newly minted bitcoin for their effort. The miner computer systems are specialized computers that append blocks of transactions to the block chain.

Host computer systems reside at various nodes and may host accounts or "wallets" that allow users to make and accept payments using bitcoin. The wallet stores the public key of the Bitcoin address and its associated private key.

Bitcoin transacting requires the use of a cryptographic key pair, comprising of a public key and a private key. The private key is used to sign an authorization and the public key is used to verify the signature. Users require control over their cryptographic key pair, in order to ensure that no transaction will take place without their express authorization. Consequently users require constant access to said cryptographic key pairs.

Current solutions for the long-term offline management of cryptographic key pairs and cryptographic parameters is generally limited to "paper wallets". Said "paper wallets" store the cryptographic key pair on a piece of paper, i.e. the end user writes down the cryptographic parameter on a paper sheet or anything of similar durability. However, this solution is non-durable—e.g. not resistant to fire, water, extensive light exposure, aging, nor buried-proof, putting the cryptographic key pair at risk. It is also prone to human error, for example in the case of a bitcoin private key, the end user has to write down 64 hexadecimal characters. Nevertheless, this is one of the most commonly used methods. Common practice is to make multiple paper wallets for a single cryptographic key pair, and distribute them to several "secure" locations, like for example a vault.

Another current solution is to engrave the cryptographic key pair or another cryptographic parameter in a piece of metal, typically stainless steel and in some cases titanium. Such engraving solutions are for example disclosed by Cryptosteel and TheSteely. Both use individual characters printed on small rectangles made of metal. Said characters then have to be inserted in open rows of a metal frame. In a first step, the end user has to look for the right characters to make the first word of a cryptographic parameter, and subsequently insert these characters in the right order into a metal frame. In a second step, said frame is closed, thereby protecting the cryptographic parameter from being intercepted by a third party. However this current method has the disadvantage that it is 1) relatively time consuming, 2) not easy in use due to the small size of the character blocks, the fact that the user has to search the right character between all available blocks, and the issue that, when pushing a new letter into the frame, it can fall to a horizontal orientation instead of the desired vertical one, and 3) the non-user-friendly sealing mechanisms, whereby a user has to be very cautious when opening the frame to regain the cryptographic key pair, in order to ensure that no character blocks fall out of the frame, which would corrupt the cryptographic parameter.

The present invention aims to resolve at least some of the problems and disadvantages mentioned above.

Without limiting the invention to cryptographic key pairs, the invention is well suited for long-term offline management of all sorts of cryptographic parameters.

SUMMARY OF THE INVENTION

In a first aspect, the present invention relates to a method according to claim 1. More particular, the method as described herein provides a method for the interception-proof transmission of at least one cryptographic parameter from a user to an encrypted offline storage medium, comprising steps of: cloaking an upward portion of a substrate with an upper plate, characterized in that said upper plate comprises a multitude of indicia, wherein each indicium has a corresponding manipulation indicator; sequentially positioning a manipulation apparatus over one or more of the manipulation indicators; mechanically manipulating the substrate, after each sequential positioning of the manipulation apparatus, using said manipulation apparatus, characterized in that the manipulation indicator of the desired indicium overlaps with one mechanical manipulation unit of the substrate; and deconstructing said substrate in two or more complementary units, characterized in that said complementary units each comprises at least one mechanical manipulation unit administered by the manipulation apparatus.

In a second aspect, the present invention relates to a system. More particular, the system as described herein provides a system for long-term offline management of cryptographic parameters, the system comprising: an apparatus, wherein said apparatus comprises an upper plate and a manipulation apparatus, characterized in that said upper plate comprises a multitude of indicia, and wherein each indicium has a corresponding manipulation indicator; and a substrate, wherein a user mechanically manipulates said substrate using the manipulation apparatus and the upper plate, wherein said mechanical manipulations overlap with the manipulation indicators of the desired indicia, and characterized in that said substrate is deconstructed in two or more complementary units, wherein said complementary units each comprises at least one mechanical manipulation unit administered by the manipulation apparatus.

In a third aspect, the present invention relates to an apparatus according to claim 5. More particular, an apparatus for the interception-proof transmission of at least one cryptographic parameter from a user to an encrypted offline storage medium, comprising: a manipulation apparatus; a substrate; and an upper plate, wherein said upper plate comprises a multitude of indicia, and wherein each indicium has a corresponding manipulation indicator.

In a fourth aspect, the invention relates to a use as described in detail below.

In a fifth aspect, the invention relates to a method as described in detail below.

The invention as disclosed offers a durable, user-friendly alternative to the pre-existing offline storage solutions. An advantage of the present invention is that it provides a tangible encrypted offline storage medium that manifests as a nonsensical pattern of mechanical manipulations when not in conjunction with the indicia of the upper plate.

Preferred embodiments of the method and preferred embodiments of the system are shown hereinbelow. Said embodiments related to the user-friendliness of the invention.

DETAILED DESCRIPTION OF THE INVENTION

The present invention concerns a method for the interception-proof transmission of at least one cryptographic parameter from a user to an encrypted offline storage medium. The present invention also concerns a system for long-term offline management of cryptographic parameters. Lastly, the present invention also concerns an apparatus for the interception-proof transmission of at least one cryptographic parameter from a user to an encrypted offline storage medium. In certain embodiments, said method and/or said system and/or said apparatus can for example be used for backing up the recovery key of a cryptocurrency wallet, however, the invention is not limited to blockchain or cryptocurrency related applications. For example, a host of other non-cryptocurrency information coding, storage and transfers may benefit from the present invention, applications and techniques detailed herein. For example, rights related to access, title transfers, wills or probate, various assets and other non-currency instruments may incorporate embodiment features and techniques taught herein.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

The term "cryptographic parameter" should be understood as information essential for the functioning of a cryptographic system, said information can be information relative one of cryptocurrency rights, title rights, probate rights, asset rights access rights, and mnemonic words, however said information is not limited by abovementioned examples.

The term "cryptographic system" should be understood as a suite of cryptographic algorithms needed to implement a particular security service, most commonly used for, however not limited to, achieving confidentiality.

The term "substrate" should be understood as a material, layer or other structure having a surface, that is capable of receiving information through mechanical manipulation.

The term "manipulation apparatus" should be understood as an apparatus that facilitates the priming and/or processing of a substrate and/or workpiece.

The term "manipulation indicator" should be understood as an indicator used to visually aid a user, when priming and/or processing a substrate and/or workpiece.

Said "manipulation indicator" comprises for example, however is not limited to, a perforation.

The term "fastening system" should be understood as comprising all systems for the releasable fixing of a first component on a second component, however not limited to, systems comprising only two components.

The term "projected area" should be understood as the two-dimensional area measurement of a three-dimensional object, by projecting its shape on to an arbitrary plane.

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention relates to a method for the interception-proof transmission of at least one cryptographic parameter from a user to an encrypted offline storage medium, comprising steps of: cloaking an upward portion of a substrate with an upper plate, characterized in that said upper plate comprises a multitude of indicia, wherein each indicium has a corresponding manipulation indicator; sequentially positioning a manipulation apparatus over one or more of the manipulation indicators; mechanically manipulating the substrate, after each sequential positioning of the manipulation apparatus, using said manipulation apparatus, characterized in that the manipulation indicator of the desired indicium overlaps with one mechanical manipulation unit of the substrate; and deconstructing said substrate in two or more complementary units, characterized in that said complementary units each comprises at least one mechanical manipulation unit administered by the manipulation apparatus.

In a second aspect, the invention relates to a system for long-term offline management of cryptographic parameters, the system comprising: an apparatus, wherein said apparatus comprises an upper plate and a manipulation apparatus, characterized in that said upper plate comprises a multitude of indicia, and wherein each indicium has a corresponding manipulation indicator; and a substrate, wherein a user mechanical manipulates said substrate using the manipulation apparatus and the upper plate, wherein said mechanical manipulations overlap with the manipulation indicators of the desired indicia, and characterized in that said substrate is deconstructed in two or more complementary units, wherein said complementary units each comprises at least one mechanical manipulation unit administered by the manipulation apparatus.

In a third aspect, the invention relates to an apparatus for the interception-proof transmission of at least one cryptographic parameter from a user to an encrypted offline storage medium, comprising: a manipulation apparatus; a substrate; and an upper plate, wherein said upper plate comprises a multitude of indicia, and wherein each indicium has a corresponding manipulation indicator.

As such, the invention or any aspect thereof may lead to an improvement in the safe-keeping of cryptographic parameters. The invention as disclosed offers a durable, user-friendly alternative to the pre-existing offline storage solutions. An advantage of the present invention is that it provides a tangible encrypted offline storage medium that manifests as a nonsensical pattern of mechanical manipulations when not in conjunction with the indicia of the upper plate. Due to the nonsensical nature of said mechanical manipulations, a user can carry the mechanically manipulated substrate in his/hers wallet or pocket without having to worry about a third party stealing said substrate and subsequent gaining access to the users sensitive cryptographic data. In order for someone to gain access to said cryptographic data, a conjunction of both the substrate and the upper plate needs to be formed.

An additional security layer is introduced by deconstructing the mechanically manipulated substrate in two or more complementary units, wherein said complementary units each comprise a portion of the mechanical manipulations of the substrate, preferably at least one mechanical manipulation unit. This deconstruction offers the advantage, that when a third party finds one or more complementary units, it is impossible for said party to retrieve the users' sensitive cryptographic data.

In an embodiment of the invention, the mechanically manipulated substrate is deconstructed in at least two complementary units, wherein at least two units have an equal projected area when the flat side of the substrate is horizontally positioned. In a further embodiment of the invention, the mechanically manipulated substrate is deconstructed in at least two complementary units, wherein at least two units have an unequal projected area when the flat side of the substrate is horizontally positioned.

A manipulation apparatus is needed, in order to provide a user with a user friendly tool to facilitate the mechanical manipulation of the substrate.

In an embodiment of the invention, the indicia of the upper plate can be used as manipulation indicators.

In a preferred embodiment of the invention, the method further comprises a step of storing the multitude of indicia in a blockchain or in a block of a blockchain. In another preferred embodiment of the invention, the system comprises the storage of the multitude of indicia in a blockchain or in a block of a blockchain.

The user is given a unique product key, which said user can use to log on to a dedicated blockchain which holds the multitude of indicia. In the event of the destruction or loss of the upper plate, the user would still be able to decipher his cryptographic data, as this information is stored on a blockchain. The company producing the upper plates could for example go bankrupt, yet the user could still retrieve the upper plate part from said blockchain, in the event of it being lost or broken.

In a further embodiment of the invention, the multitude of indicia is stored in a blockchain or in a block of a blockchain, preferably as a printable version of the upper plate.

In a preferred embodiment of the invention, the step of cloaking the upward portion of a substrate, includes a step of positioning the substrate between the upper plate and a lower plate, and wherein the upper and lower plate are connected using a fastening system.

In another preferred embodiment of the invention, the invention comprises a system, wherein prior to the manipulation of the substrate, said substrate is positioned between the upper plate and a lower plate, and wherein the upper and lower plate are connected using a fastening system.

The inventors have unexpectedly found that by positioning the substrate between the upper plate and a lower plate, the mechanical manipulation of said substrate improved. The reason for this improvement is the dampening of a recoil, when a punching apparatus is used. Said type of recoil manifests when a force is exerted on a supporting surface during a mechanical manipulation.

An additional benefit of using a lower plate, is the protection of the underlying surface. When a user for example mechanically manipulates the substrate using a punching apparatus, a residual force is exerted to said underlying surface. This residual force can damage the surface. An additional benefit of using a lower plate, is the prevention of the transmission of the mechanical manipulations to the underlying surface, which would allow an intruder to retrieve the code from said underlying surface.

By using a fastening system to connect the upper plate, the lower plate, and the substrate, positioned between said upper and lower plate, a firm layersystem is formed. This firm layersystem prevents the displacement of the substrate during the mechanical manipulation of the substrate. By preventing the displacement of the substrate, the consistency of the mechanical manipulations is improved and errors are prevented. Overall, the user-friendliness of the apparatus is improved by fastening the different plates.

In a further embodiment of the invention, the fastening system can comprise any of the standard mechanical connectors disclosed in the prior-art, or any of the standard magnetic connectors disclosed in the prior-art. For example, the fastening system can comprise at least one clamping system, magnetic strip, or a combination thereof.

In an embodiment of the invention, no lower plate is used. The substrate and the upper plate can thereby be firmly connected, by for example using a sliding-hook system. Said sliding-hook system is attached to the upper plate, and comprises at least one hook-clip, wherein said hook-clips define an underlying aperture. The hook-clip clamps the substrate, when a user slides said substrate in the aperture defined by the hook-clip.

In a preferred embodiment of the invention, the manipulation apparatus is a punching apparatus.

By using a punching apparatus, a more precise and consistent mechanical manipulation of the substrate is achieved. In contrast to a method wherein for example a scraping apparatus is used. Said scraping apparatus can be used to mechanically manipulate the substrate, by scraping the surface of the substrate using said scraping apparatus.

In a preferred embodiment of the invention, the punching apparatus is a pen with a spring mechanism, comprising a distal extremity and a proximal extremity, wherein the distal extremity comprises a deformation head, and wherein the proximal extremity comprises a releasing button.

To record the first indicium of the cryptographic parameter, a user positions the pen over the manipulation indicator. Wherein said manipulation indicator corresponds with the first indicium of the cryptographic parameter. After said positioning, the user pushes the releasing button on the proximal extremity of the pen. By pushing the releasing button of this proximal extremity, the spring mechanism is released. By releasing said spring mechanism, a force is exerted by the deformation head on the surface of the underlying substrate, resulting in mechanical manipulation of the substrate. By using a spring mechanism, the user experience is enhanced because it doesn't require the user to exert much physical effort. Subsequent indicia of the cryptographic parameters are mechanically manipulated in the substrate in a similar manner.

In a preferred embodiment of the invention, the deformation head is detachable.

When using a pen wherein the distal extremity comprises a detachable deformation head, a user can simply replace the currently attached deformation head when it has for example become blunt or when it is damaged. By being able to replace the deformation heads, the quality of the mechanical manipulations is never compromised.

In a preferred embodiment of the invention, the lateral circumference of the detachable deformation head can be any shape, preferably a circular circumference or a shape that is visually distinctive from a circular circumference.

A shape that is visually distinctive from a circular shape, can be defined within the contents of this text, as being a shape that has a circumference, comprising at least one straight portion, at least one curved portion, or a combination thereof.

In an embodiment of the invention, the lateral circumference of the detachable deformation head, that is visually distinctive from a circular circumference, has preferably a cross-shaped circumference. In a further embodiment of the invention, the lateral circumference of the detachable deformation head, that is visually distinctive from a circular circumference, has preferably the circumference of a logo, wherein said logo can be any logo, preferably the logo of the company producing the plates.

The advantage of using detachable deformation heads with variable lateral circumferences, is that when mechanically manipulating the substrate, the user is assured that at a later point in time a correction is still possible. When a user has for example mechanically manipulated the substrate using a punching apparatus with a deformation head with a lateral circular circumference, the user can still correct a mistake by changing the deformation head of the apparatus, to for example a deformation head with a lateral cross-shaped circumference, and subsequently superimpose a cross-shaped mechanical manipulation over the pre-existing circular mechanical manipulation.

The advantage of using a detachable deformation head with the circumference of a logo, is that a third party is unable to render the substrate unusable by adding an additional nonsensical or misleading mechanical manipulation to said substrate. When a third party does not have access to a deformation head with the same lateral circumference, as the deformation head used in the initial manipulation of the substrate by the user, said party is unable to render the substrate unusable.

In a preferred embodiment of the invention, the indicia of the upper plate are customizable by a user.

The advantage of having an upper plate with customizable indicia, is that no interception of the multitude of indicia is possible by a third party during the production or shipping of said upper plate. In an embodiment of the invention, the user is able to alter the stored multitude of indicia in a blockchain or in an encrypted block of a blockchain.

In a preferred embodiment of the invention, the manipulation indicator is a perforation.

The advantage of using a perforation as the manipulation indicator, is the easy accessibility of the underlying substrate by the manipulation apparatus. When for example a pen with a deformation head is used, the perforation allows a direct contact between the deformation head and the underlying substrate. This direct contact results in a more precise manipulation of the substrate. The inventors observed that by using a perforation, the shape of the lateral circumference of the detachable deformation head is more clearly transmitted to the substrate, in comparison to an embodiment of the invention wherein the manipulation indicator of the upper plate must be punctured.

In an alternativeembodiment of the invention, the substrate and/or at least one unit of the deconstructed substrate and/or at least a combination of two or more units of the deconstructed substrate, is in accordance with the ID-1-format of ISO/IEC 7810.

The ISO/IEC 7810 ID-1 standard is defined by the International Organization for Standardization (ISO) and the International Electrotechnical Commission (IEC) and is widely used for banking cards (credit cards, debit cards, ATM cards, etc.), driver's licenses and ID cards. The ISO/IEC 7810 ID-1 format specifies a size of 85.60 mm×53.98 mm. By using the widely accepted ID-1 format, a user can easily store the deconstructed substrate or parts of the deconstructed substrate in a secure location such as for example, however not limited to, a wallet or a card holder.

In an alternative embodiment of the invention, the substrate and/or at least one unit of the deconstructed substrate and/or at least a combination of two or more units of the deconstructed substrate, is in accordance with the ID-2-format of ISO/IEC 7810.

In a further alternative embodiment of the invention, the substrate and/or at least one unit of the deconstructed substrate and/or at least a combination of two or more units of the deconstructed substrate, is in accordance with the ID-3-format of ISO/IEC 7810.

By using an easily portable format that is widely accepted, a user can easily store the deconstructed substrate or parts of the deconstructed substrate in a secure location, preferably a portable secure location such as for example, however not limited to, a wallet or a card holder.

In an alternative embodiment of the invention, the substrate and/or at least one unit of the deconstructed substrate and/or at least a combination of two or more units of the deconstructed substrate, is in accordance with the ID-000-format of ISO/IEC 7810.

In a further alternative embodiment of the invention, the substrate and/or at least one unit of the deconstructed substrate and/or at least a combination of two or more units of the deconstructed substrate, is in accordance with the Mini-UICC format of ETSI TS 102 221 V9.0.0.

In a further alternative embodiment of the invention, the substrate and/or at least one unit of the deconstructed substrate and/or at least a combination of two or more units of the deconstructed substrate, is in accordance with formats of ETSI TS 102 221 V11.0.0.

By using a format that is widely accepted, a user can easily store the deconstructed substrate or parts of the deconstructed substrate in a secure location, for example, however not limited to, a SIM card slot or a memory card slot.

In an alternative embodiment of the invention, the substrate and/or at least one unit of the deconstructed substrate and/or at least a combination of two or more units of the deconstructed substrate, may conform to any standards or dimensional envelope. For example, one of the complementary units of the deconstructed substrate may conform to a future form factor standard provided by the International Standard Organization and/or the European Telecommunications Standards Institute. For example, one of the complementary units of the deconstructed substrate may have a height of between approximately 11.8 and 12 millimeters and width of between approximately 8.7 and 8.9 millimeters. In other examples, the height may be between about 10.9 and 11.1 millimeters and the width may be between about 8.9 and 9.7 millimeters. Further, in some examples, the fourth UICC 116 may have a thickness of between approximately 0.64 and 0.70 millimeters. In some examples, the UICC 116 may have a thickness of between approximately 0.68 and 0.84 millimeters.

In an alternative embodiment of the invention, the upper plate is in accordance with the ID-1-format of ISO/IEC 7810. In a further embodiment of the invention, the upper plate is in accordance with the ID-2-format of ISO/IEC 7810. In a further embodiment of the invention, the upper plate is in accordance with the ID-3-format of ISO/IEC 7810. In an embodiment of the invention, the upper plate is in accordance with the ID-000-format of ISO/IEC 7810.

In an embodiment of the invention, a downward portion of the substrate has an ornament, preferably said ornament is laser engraved. In a further embodiment of the invention, a downward portion of the upper plate has an ornament, preferably said ornament is laser engraved.

By adding an ornament to the downward portion of the substrate or the downward portion of the upper plate, the outlook of the respective surfaces is as inconspicuously as possible. Another advantage of adding an ornament to said downward portions, is that a user can use said substrate or upper plate as a piece of decoration.

In an embodiment of the invention, the substrate has a Vickers hardness greater than 120 kgf/mm$^2$, preferably greater than 200 kgf/mm$^2$, more preferably greater than 400 kgf/mm$^2$, even more preferably greater than 600 kgf/mm$^2$.

In a further embodiment of the invention, the substrate has a scratch-resistant coating, wherein said scratch-resistant coating has a Vickers hardness greater than 120 kgf/mm$^2$, preferably greater than 200 kgf/mm$^2$, more preferably greater than 400 kgf/mm$^2$, even more preferably greater than 600 kgf/mm$^2$.

By using a substrate or a scratch-resistant coating that conforms with a Vickers hardness greater than 120 kgf/mm$^2$, preferably greater than 200 kgf/mm$^2$, more preferably greater than 400 kgf/mm$^2$, even more preferably greater than 600 kgf/mm$^2$, the substrate or the scratch-resistant coating is resilient to daily-use scratches. By using a scratch resilient surface, the quality of the mechanical manipulations, as well as the separation between the different mechanical manipulation units is maintained. Subsequently, the ability of a user to decipher the mechanical manipulations using the upper plate is not hampered.

In an embodiment of the invention, the substrate has weakened zones, wherein said weakened zones are designated for breaking the substrate into the complementary units. In a further embodiment of the invention, the weakened zones are trim parts, preferably produced using an ultra sound cutting method.

In an embodiment of the invention, the substrate is in accordance with ISO/IEC 7810:2003, preferably the substrate is in accordance with the requirements of ISO/IEC 7810:2003 related to the physical characteristics. ISO/IEC 7810:2003 is one of a series of standards describing the characteristics of identification cards. It is the purpose of ISO/IEC 7810:2003 to provide criteria to which cards shall perform and to specify the requirements for such cards used for international interchange. It takes into consideration both human and machine aspects and states minimum requirements. The requirements of ISO/IEC 7810:2003 related to the physical characteristics are specified for the bending stiffness, flammability, toxicity, resistance to chemicals, dimensional stability, adhesion or blocking, warpage, resistance to heat, surface distortions, and contamination. By conforming to the ISO/IEC 7810:2003 requirements related to the physical characteristics, the ability of the user to decipher the mechanical manipulations using the upper plate will not be hampered.

In a preferred embodiment of the invention, the substrate is stainless steel-based, titanium-based, carbon-based, or is based on combinations of said materials. In a further embodiment of the invention, the substrate is preferably stainless steel-based.

By using stainless steel-based, titanium-based, carbon-based materials, or a combination of said materials, a substrate can easily be produced that is in accordance with the requirements of ISO/IEC 7810:2003 related to the physical characteristics that are specified for the bending stiffness, flammability, toxicity, resistance to chemicals, dimensional stability, adhesion or blocking, warpage, resistance to heat, surface distortions, and contamination. Moreover using said materials, a substrate can easily be produced which is also resilient to daily-use scratches.

According to a third aspect, the invention relates to an apparatus for interception-proof transmission of at least one cryptographic parameter from a user to an encrypted offline storage medium. The apparatus comprising a manipulation apparatus, a substrate and an upper plate. The upper plate comprises a multitude of indicia. Each indicium has a corresponding manipulation indicator.

In a fourth aspect, the invention relates to the use of the apparatus according to the third aspect for storage of a cryptographic parameter of a cryptocurrency network. Preferably, the invention relates to use of the apparatus according to the third aspect for storage of a cryptographic key pair of a cryptocurrency network. Preferably, the invention relates to use of the apparatus according to the third aspect for storage of a private key of a cryptocurrency network. Preferably, the invention relates to use of the apparatus according to the third aspect for storage of a recovery key of a cryptocurrency wallet. Preferably, the invention relates to use of the apparatus according to the third aspect for storage of a recovery seed of a cryptocurrency wallet. Most preferably, the invention relates to use of the apparatus according to the third aspect for storage of a master seed of a cryptocurrency wallet.

In a fifth aspect, the invention relates to a method for storage of a cryptographic parameter of a cryptocurrency network. Preferably, for storage of a cryptographic parameter of a cryptocurrency network on a substrate, preferably whereby said cryptographic parameter is provided in a hexadecimal numeral system. Preferably, for storage of a cryptographic key pair of a cryptocurrency network. Preferably, for storage of a private key of a cryptocurrency network. Preferably, for storage of a recovery key of a cryptocurrency wallet. Preferably, for storage of a recovery seed of a cryptocurrency wallet. Most preferably, for storage of a master seed of a cryptocurrency wallet. The method preferably comprises the step of cloaking an upward portion of the substrate with an upper plate. Preferably, said upper plate comprising a multitude of indicia. Preferably, each indicium having a corresponding manipulation indicator. The method preferably further comprising the step of sequentially positioning a manipulation apparatus over one or more of the manipulation indicators. The method preferably further comprising the step of mechanically manipulating the substrate, after each sequential positioning of the manipulation apparatus, using said manipulation apparatus and whereby the manipulation indicator of the desired indicium overlaps with one mechanical manipulation unit of the substrate.

The above disclosure provides an apparatus, use of the apparatus and a method. A person having ordinary skill in the art will appreciate that the method can be executed using the apparatus. Furthermore, a person having ordinary skill in the art will appreciate that the method is also applicable to the uses of the apparatus as disclosed herein. In what follows, the five different aspects of the current invention are therefore treated together and every aspect or embodiment discussed hereabove or hereafter is applicable to either of said aspects.

According to a preferred embodiment, the substrate is substantially planar. The upward portion of a planar surface is easily cloaked by the upper plate. Thus, allowing easy manipulation and/or reading of the substrate. Preferably, the substrate is substantially rectangular. Alternatively, the substrate may also be square, circular, elliptical, etc. A rectangular substrate is preferred as it is easily stored and produced. Preferably, the rectangular substrate has rounded edges, as to prevent cutting.

According to a further preferred embodiment, the substantially rectangular substrate has a width and a length. Preferably, the width is at least 100 mm. Preferably, the length is at least 50 mm. The inventors note that such width and length are required to have sufficient indicia for encrypted storage of most cryptographic parameters. Most cryptographic parameters, especially those related to cryptocurrencies, are stored in a hexadecimal format ranging from 0-9 and A-F and have a character length ranging between 32 and 128 characters. Storing such amount of characters in an encrypted hexadecimal format, while still being readable, require that the width and length are respectively at least 100 mm and 50 mm.

According to a preferred embodiment, said multitude of indicia are provided in a number of encryption units on the upper plate. Preferably, the number of encryption units is at least equal to a character length of the at least one cryptographic parameter. Preferably, each of said number of encryption units comprises at least an equal number of indicia to a number of characters in a writing system of the at least one cryptographic parameter. Such configuration is easily surveyable. Such configuration allows for an easy encryption of the at least one cryptographic parameter. Such configuration allows for an easy deciphering of the cryptographic parameter.

A method for using the above preferred embodiment, comprises, for each encryption unit, the step of positioning the manipulation apparatus over a manipulation indicator corresponding to a desired indicium. Each encryption unit of has an encryption unit number. The desired indicium corresponds with a current character of the at least one cryptographic parameter. The current character has a character number corresponding to a current unit number. The current unit number corresponds with the unit number of the encryption unit wherefore the current positioning is performed. The method further comprises, for each encryption unit and after each positioning the manipulation apparatus, the step of mechanically manipulating the substrate using said manipulation apparatus.

According to a further preferred embodiment, said encryption units are columns. Preferably, each of said column comprises at least an equal number of rows, each comprising an indicium, to an amount of characters in a writing system of the at least one cryptographic parameter. Thus, providing a grid formation. Such grid formation is especially preferred as it is easily surveyable.

According to a preferred embodiment, said multitude of indicia are provided in a grid formation on the upper plate. Preferably, the manipulation indicators corresponding to said multitude of indicia are also provided in a grid formation. Preferably, each of the indicia and/or manipulation indicators are equally spaced apart. Such configuration is easily surveyable. Preferably, each of the indicia and the corresponding manipulation indicator is separated from an adjacent indicium or an adjacent manipulation indicator by a separator symbol, preferably a line.

According to a further preferred embodiment, said grid formation comprises at least an equal number of columns or rows to a character length of the at least one cryptographic parameter. Each column or row may thus represent a character of the at least one cryptographic parameter. Preferably, each column represents a character of the at least one cryptographic parameter. The corresponding rows may thus represent different indicia for encrypting each character of the at least one cryptographic parameter.

According to a further preferred embodiment, said grid formation comprises at least an equal number of columns or rows to an amount of characters in a writing system of the at least one cryptographic parameter. Preferably, each row represents a character of the writing system of the at least one cryptographic parameter. Preferably, the writing system is a numeration system or numeral system. In accordance with a cryptographic parameter, such as a private key, for a cryptocurrency network, the writing system is most commonly the hexadecimal system.

According to a preferred embodiment, said grid formation comprises at least an equal number of columns to a character length of the at least one cryptographic parameter and each column of said grid formation comprises at least an equal number of rows, each comprising an indicium, to an amount of characters in a writing system of the at least one cryptographic parameter. Such configuration is easily surveyable. Such configuration allows for an easy encryption of the cryptographic parameter, in particular a private key of a cryptocurrency network. Such configuration allows for an easy deciphering of the cryptographic parameter, in particular a private key of a cryptocurrency network. Most preferably, the character length of the at least one cryptographic parameter is 64 characters. Most preferably, the writing system of the at least one cryptographic parameter is the hexadecimal numeral system.

A method for using the above preferred embodiment, comprises, for each column of said grid formation, the step of positioning the manipulation apparatus over a manipulation indicator corresponding to a desired indicium. Each column of the grid formation has a column number. The desired indicium corresponds with a current character of the at least one cryptographic parameter. The current character has a character number corresponding to a current column number. The current column number corresponds with the column number of the column wherefore the current positioning is performed. The method further comprises, for each column of said grid formation and after each positioning the manipulation apparatus, the step of mechanically manipulating the substate using said manipulation apparatus.

According to a preferred embodiment, the indicia of each encryption unit correspond with a random sequence of each of the characters in said writing system. Thus, providing an encryption for each of the characters of the at least one cryptographic parameter. Preferably, said random sequence is customizable for each encryption unit.

According to a preferred embodiment, the indicia of each column of said grid formation corresponds with a random sequence of each of the characters in said writing system. Thus, providing an encryption for each of the characters of the at least one cryptographic parameter. Preferably said random sequence is, preferably by a user, customizable for each column.

According to a most preferred embodiment, the invention as disclosed herein is used for storing a master seed of a cryptocurrency wallet. Such master seed can be considered as an ultimate backup of a cryptocurrency wallet. Therefore, secure as well as long-term storage of the master seed is of the utmost importance. The current invention provides an extremely secure storage method optimal for storing such master seed. Alternatively, the invention as disclosed herein may also be used for storage of any cryptographic parameter related to any a cryptocurrency network, in particular for example a cryptographic key pair of a cryptocurrency network or a private key of a cryptocurrency network.

A master seed traditionally comprises 64 characters. To facilitate storage of such seed, the upper plate is provided with a multitude of indicia and corresponding manipulation indicators. Preferably, said multitude of indicia and corresponding manipulation indicators are provided in one or more grid formations. Preferably, the one or more grid formations comprise at least 64 columns. Preferably, each of said at least 64 columns comprises 16 indicia and 16 corresponding manipulation indicators. Such configuration is ideal, as it allows for storage of a master seed of a cryptocurrency wallet, as each character of such seed can be securely stored in each of the 64 columns.

According to a most preferred embodiment, the substantially rectangular substrate has a width of at least 170 mm and at most 250 mm. According to a most preferred embodiment, the substantially rectangular substrate has a length of at least 120 mm and at most 170 mm. The inventors note that these dimensions are ideal for compactly storing between 32 columns and 128 columns in one or more rows, which corresponds to the requirements of most private keys of cryptocurrency networks. Most preferably, the substantially rectangular substrate has a width of 200 to 220 mm, preferably about 200 mm, and a length of about 120 mm to 160 mm, preferably about 148 mm. The inventors note that these dimensions are in particular suited for storing 64 columns in two rows as disclosed hereabove, without being unpractical. Thus, such dimensions are ideal for storing, among others, a master seed or a private key of, for example, the Bitcoin network or a network with a similar encryption strategy.

According to a further preferred embodiment, the planar substrate has a thickness of at least 1 mm. The inventors note that a 1 mm thickness is ideal for mechanically manipulating the surface, without having a substantial risk of puncturing the substrate. Such thickness is particular advantageous for metal and stainless-steel substrates. Preferably, the planar substrate has a thickness of at most 5 mm. Increasing the thickness further than 5 mm has the disadvantage that weight is significantly increased, especially for metal substrates. Furthermore, a thickness greater than 5 mm also complicates storage. Ideally, the planar substrate has a thickness of 1.5 mm to 2.5 mm, preferably about 2 mm. Extensive research by the inventors shows that such thickness is most preferred by users, especially in combination with a metal implementation of the substrate and most especially in combination with a stainless-steel implementation of the substrate. The inventors note that such embodiments are tough, scratch-resistant, light-weight and are easily stored.

According to a preferred embodiment, the substrate substantially comprises, and preferably consists of, metal. Substrates substantially comprising metal are less prone to wear, cracking or breakage, compared to for example cardboard or plastic materials. Thus, metal materials are most preferred when constructing the substrate as such substrates securely store cryptographic parameters. Preferably, said metal is stainless steel, as stainless steel has high temperature resistance, corrosion resistance and mechanical strength. Most preferably, the metal of the substrate is AISI 316 stainless steel.

According to a further preferred embodiment, the metal substrate has a brushed surface finishing. After extensive experimentation, the inventors noted that a brushed surface finishing reduces glare of a metal surface and thereby improves the visibility of the mechanical manipulations in the upper surface of the substrate. Furthermore, a brushed surface finishing has a premium look, as it retains some, but not all, of its metallic lustre and is given a pattern of very fine lines parallel to a brushing direction.

According to a preferred embodiment, the manipulation apparatus substantially comprises, and preferably consists of, metal. An apparatus that substantially comprises metal is less prone to wear, cracking or breakage, compared to for example cardboard or plastic materials. Preferably, the manipulation apparatus has a brushed surface finishing.

According to a preferred embodiment, the manipulation apparatus is a pen comprising a distal extremity, whereby said distal extremity comprises a deformation head and whereby said deformation head is a metallic tip. A pen is ideal for targeted manipulation of the substrate by a user. A metallic tip is ideal for etching the upper surface of the substrate.

Preferably, said deformation head is a metallic tip with a hardness similar to a hardness of said substrate. Preferably said deformation head has a hardness substantially greater than a hardness of said substrate. Such configurations allow for an easy and repetitive mechanical manipulation of the substrate.

According to a preferred embodiment, the manipulation apparatus is a punching apparatus. Preferably, the punching apparatus is a pen with a spring mechanism. Preferably, the punching apparatus is a pen with a loaded spring mechanism. The pen comprising a distal extremity and a proximal extremity. Preferably, the distal extremity comprises a deformation head. Preferably, the proximal extremity comprises a releasing button. Preferably, the deformation head is connected to a first end of the spring mechanism. Preferably, the releasing button is connected to a second end of the spring mechanism. Preferably, the releasing button is configured for ejecting the deformation head along a longitudinal direction of the pen when pushed. Preferably, the releasing button is configured for loading the deformation head of the pen when released.

According to a preferred embodiment, the upper plate has a thickness of at most 1.5 mm. Further increasing the thickness has the disadvantage that weight is unnecessarily added. Preferable, the manipulation indicator is an aperture. As discussed hereabove, most cryptographic parameters have a character length ranging between 32 and 128 characters. In order to fit such large amount of characters on a limited surface, the size of the apertures has to be limited. In order for a user to view unobstructed trough such small apertures, the thickness of the plate has to be minimalized. Preferably, the thickness of the upper plate is at least 0.3 mm. Decreasing the thickness further makes the upper plate prone to breakage. Ideally, the thickness of the upper plate ranges from 0.5 mm to 1.0 mm. In particular, such thickness is advantageous when using metal materials, as these are sufficiently though to prevent breakage.

Preferably, the upper plate has a thickness of about 0.8 mm. More preferably, the upper plate has a thickness of about 0.8 mm and substantially comprises metal. Most preferably, the upper plate has a thickness of about 0.8 mm consists of stainless-steel.

According to a preferred embodiment, the upper plate substantially comprises, and preferably consists of, metal. An upper plate that substantially comprises metal is less prone to wear, cracking or breakage, compared to for example cardboard or plastic materials. Preferably, the upper plate apparatus has a brushed surface finishing. Most preferably, the metal of the upper plate is AISI 316 stainless steel.

Preferably, both the upper plate and the substrate are rectangular and have a corresponding size. More preferably, both the upper plate and the substrate have a substantially similar width or length. More preferably, both the upper plate and the substrate have a substantially similar width and length. Above configurations are advantageous as they provide for an apparatus comprising a substrate and an upper plate that are easily aligned. Thus, allowing for easy encrypting and/or deciphering.

According to a preferred embodiment, the upper plate comprises at least one positioning aperture and the substrate comprises at least one corresponding positioning indicator. Such configuration allows a user to align the upper plate with the substrate prior, during and after mechanically manipulating said substrate. Preferably, at least one of corner of the rectangular substrate is provided with a positioning aperture and at least one corner of the substrate is provided with a corresponding positioning indicator. Preferably, each of the corners of the above rectangular upper plate is provided with a positioning aperture and each of the corners of the above rectangular substrate is provided with a corresponding positioning indicator.

Preferably, the corresponding positioning indicator is one of: an aperture, a symbol, a hump, etc. Preferably, the corresponding positioning indicator is a hump. Preferably, the hump extends from an upper side of the substrate. More preferably, the hump has an outer circumference at a base of said hump substantially similar to an inner circumference of the positioning aperture. Such configuration provides a simple releasable connection between the upper plate and the substrate. Furthermore, such configuration provides a correct alignment of the upper plate and the substrate.

According to a preferred embodiment, the multitude of indicia are etched or engraved in the upper plate. Preferably, laser etched or laser engraved. More preferably, laser etched or laser engraved in a stainless-steel upper plate.

According to a preferred embodiment, the upper plate comprises an identification symbol. According to a preferred embodiment, the substrate comprises an identification symbol. Additionally, a logo may be provided on the upper plate and/or the substrate. Preferably, the identification symbol and the logo are laser etched or laser engraved. More preferably, laser etched or laser engraved in a stainless-steel upper plate or substrate. More preferably, the identification symbol of the upper plate is an identification code. Most preferably, the identification code is in a hexadecimal format.

According to a preferred embodiment, the upper plate has a weight of at least 50 g and at most 350 g, more preferably at least 100 g and at most 300 g, more preferably at least 150 g and at most 250 g, more preferably at least 170 g and at most 230 g, more preferably at least 190 g and at most 210 g, most preferably about 200 g.

According to a preferred embodiment, the substrate has a weight of at least 100 g and at most 1000 g, more preferably at least 200 g and at most 900 g, more preferably at least 300 g and at most 800 g, more preferably at least 400 g and at most 700 g, more preferably at least 430 g and at most 600 g, more preferably at least 450 g and at most 500 g, most preferably, about 470 g.

It shall be noted that any of the above embodiments can be combined or mixed.

DESCRIPTION OF FIGURE

The following description of the figures of specific embodiments of the invention is merely exemplary in nature and is not intended to limit the present teachings, their application or uses. Throughout the drawings, corresponding reference numerals indicate like or corresponding parts and features.

Figure 1:
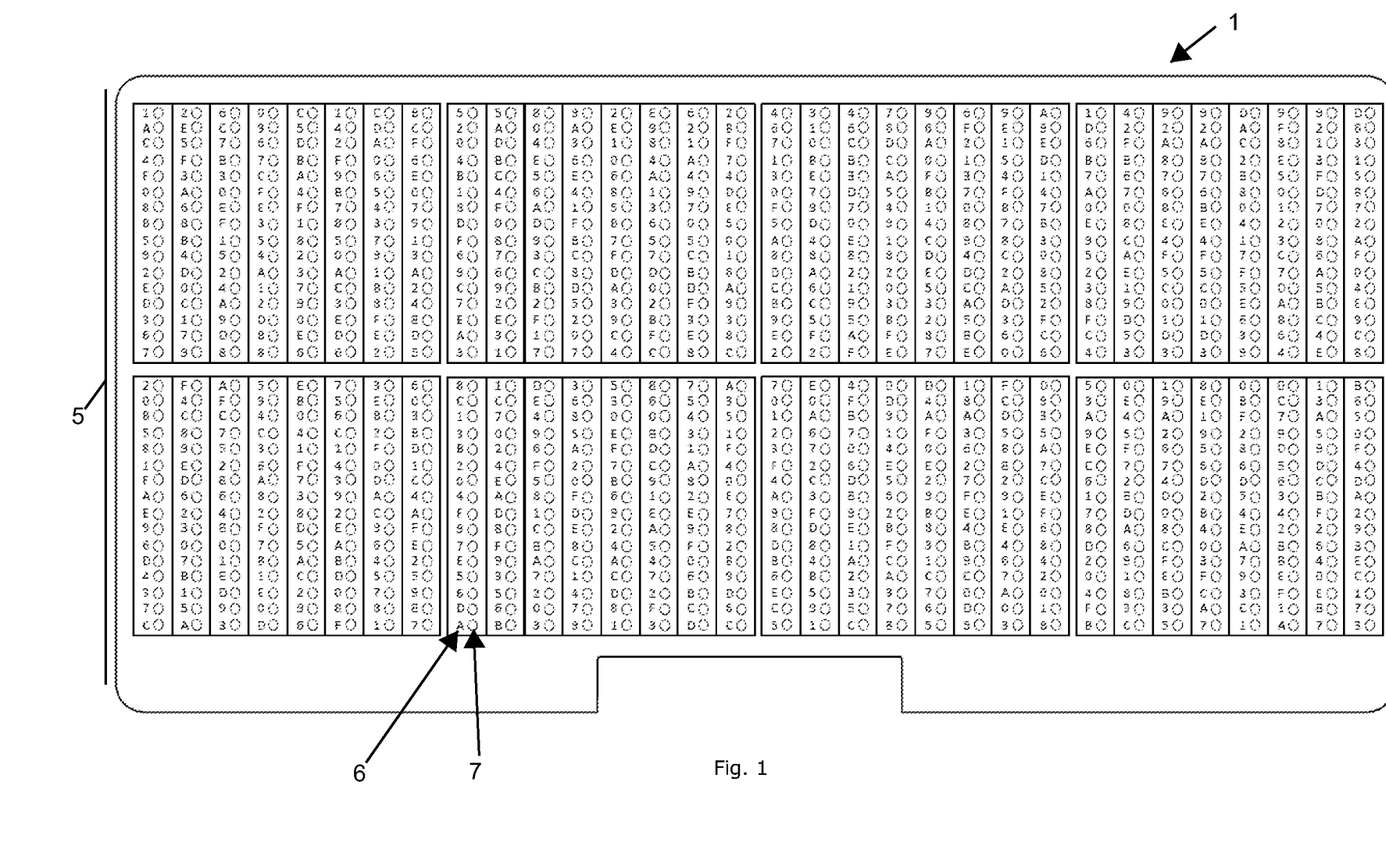
FIG. 1 shows a top view of the upper plate of an embodiment of the present invention, wherein the manipulation indicators are perforations.

FIG. 1 of the accompanying drawings illustrates a top view of the upper plate 1, wherein said upper plate comprises a multitude of indicia 5. An embodiment of the present invention is illustrated, wherein the manipulation indicators 7 are perforations, and wherein each manipulation indicator 7 is located next to its corresponding indicium 6.

Figure 2:
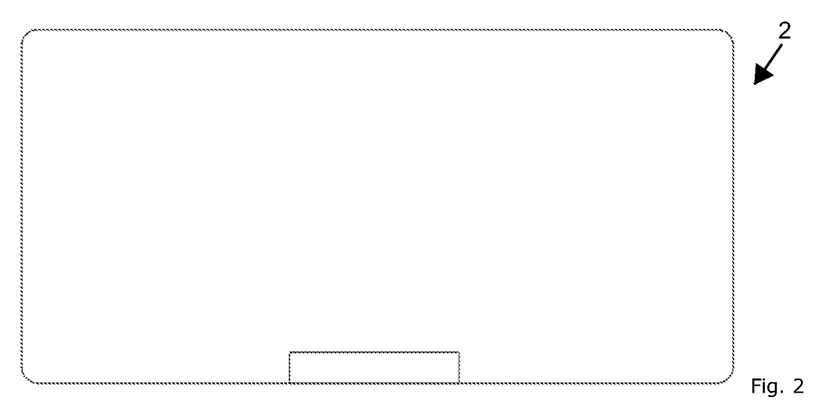
FIG. 2 shows a top view of the substrate.
Figure 3:
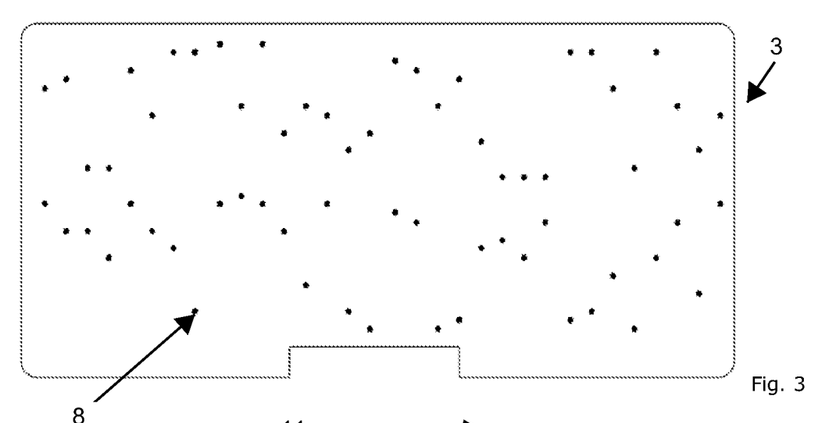
FIG. 3 shows a top view of the substrate, wherein the substrate comprises a multitude of mechanical manipulations.

FIGS. 2 and 3 of the accompanying drawings illustrate a top view of the substrate 2. Said top view of the substrate 2, corresponds with the upward portion of said substrate 2. The substrate 2 of FIG. 2 has not yet been mechanically manipulated, whereas FIG. 3 illustrates a mechanically manipulated substrate 3. Each mechanical manipulation unit 8 overlaps with its corresponding manipulation indicator 7, when the upward portion of the mechanically manipulated substrate 3 is cloaked by the upper plate 1.

Figure 4:
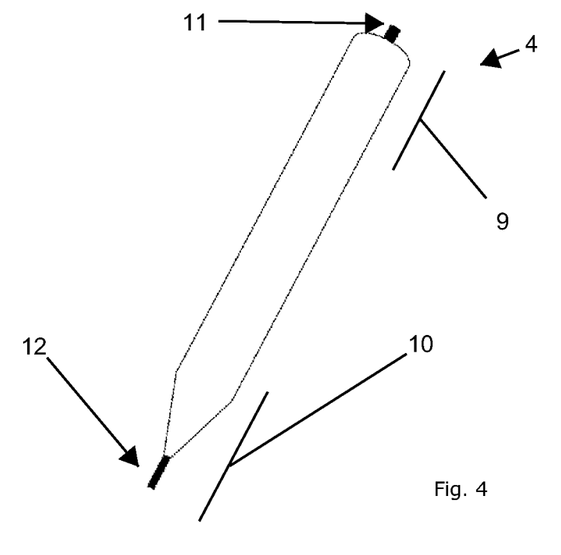
FIG. 4 shows a perspective view of an embodiment of the present invention, wherein the punching apparatus is a pen.

FIG. 4 of the accompanying drawings illustrates a perspective view of an embodiment of the present invention, wherein the punching apparatus is a pen 4. Said pen 4 comprises a distal extremity 10 and a proximal extremity 9, wherein the distal extremity 10 comprises a deformation head 12, and wherein the proximal extremity 9 comprises a releasing button 11.

FIGS. 5 to 8 show an embodiment of the apparatus according to the current invention.

Figure 5:
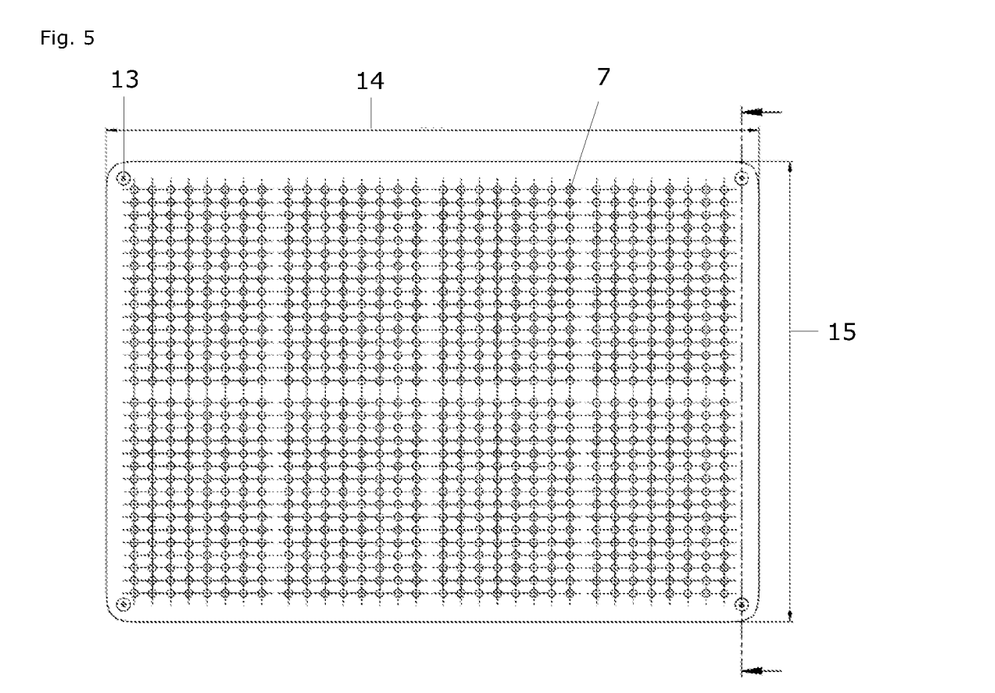
FIGS. 5 to 8 show an embodiment of the present invention.

FIG. 5 shows a top view of a preferred embodiment of the upper plate 1. The manipulation indicators 7 are provided in a grid formation comprising sixty-four columns, i.e. encryption units, of manipulation indicators 7. The columns are provided in two rows. Each column comprises sixteen manipulation indicators 7. The corresponding indicia are not shown. Preferably, the indicia correspond to the different characters in the hexadecimal numeral system. Such configuration is ideal for storing a master seed with a character length of sixty-four in a hexadecimal format. Such master seed is for example used in a Bitcoin network. However, such master seed may also be used by other cryptocurrency networks. In order to encrypt such master seed, the indicia 7 of each column are randomized. Preferably, the indicia 7 are randomized or customized by a user to improve a feeling of security.

Figure 6:
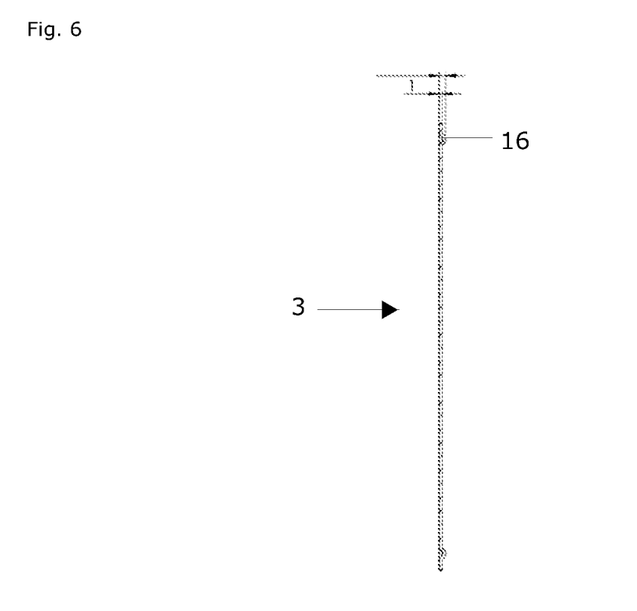
Figure 7:
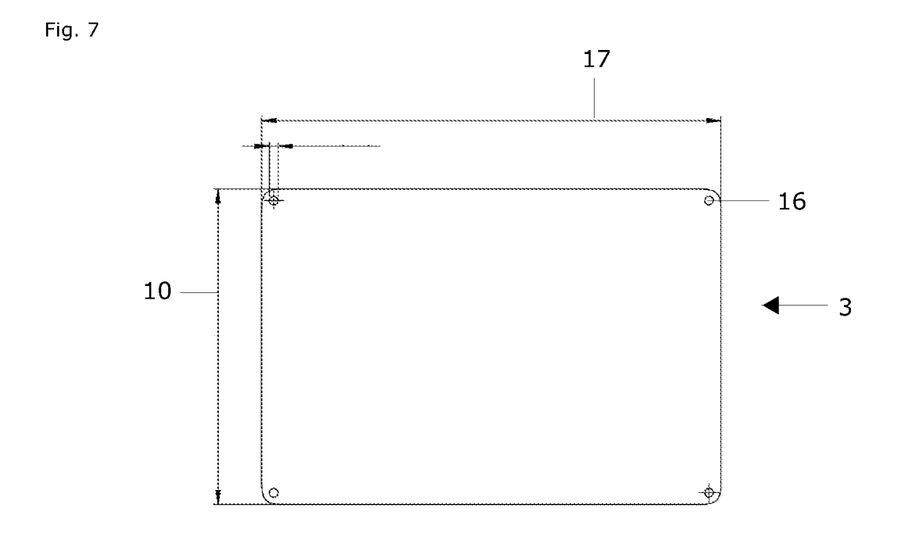
Figure 8:
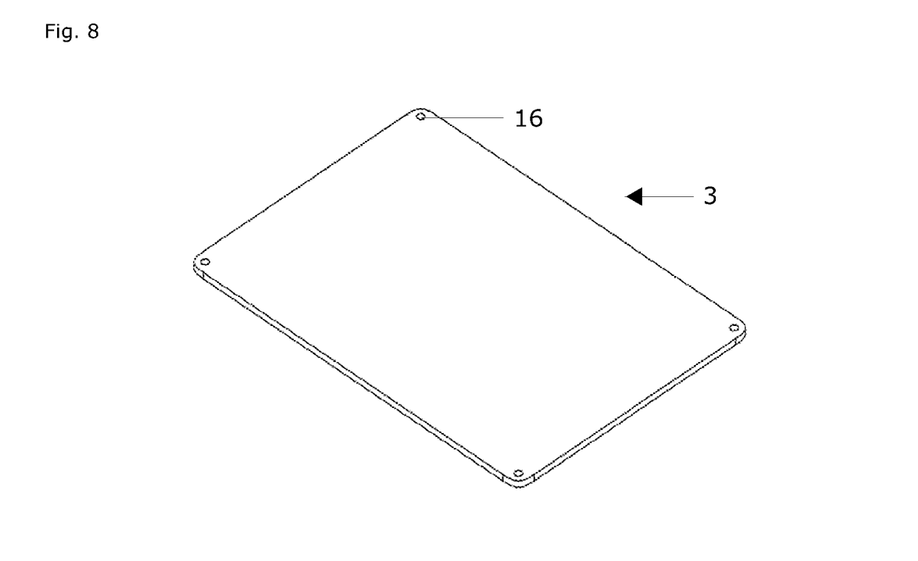

FIG. 6 shows a side view of the embodiment of the substrate. The substrate 3 comprises four hump-shaped positioning indicators 16 in each of the corners of the substrate 3. The upper plate 1, shown in FIG. 5, is provided with four positioning apertures 13 in each of the corners of the upper plate 1. When cloaking the substrate 3 with the upper plate 1, the above positioning apertures 13 and positioning indicators 16 allow for a correct alignment and releasable attachment of the upper plate 1 to the substrate 3. In this respect, both the upper plate 1 and the substrate 3 according to the current embodiment have a similar width 14, 17 and length 15, 18. FIGS. 7 and 8 respectively show a top view and a perspective view of the substrate 3 according to the embodiment.

The present invention is in no way limited to the embodiments shown in the figures. On the contrary, methods according to the present invention may be realized in many different ways without departing from the scope of the invention.

The invention claimed is:

1. An apparatus for the interception-proof transmission of at least one cryptographic parameter from a user to an encrypted offline storage medium, the cryptographic parameter consisting of information essential for the functioning of a cryptographic system, the apparatus comprising:
   a manipulation apparatus;
   a substrate; and
   an upper plate, wherein said upper plate comprises a multitude of indicia, wherein each indicium has a corresponding manipulation indicator, and
   wherein said multitude of indicia are provided in a number of encryption units on the upper plate, whereby the number of encryption units is at least equal to a character length of the at least one cryptographic parameter, whereby each of said number of encryption units comprises at least an equal number of indicia to a number of characters in a writing system of the at least one cryptographic parameter and whereby the indicia of each encryption unit correspond with a random sequence of each of the characters in said writing system; and wherein the cryptographic parameter is provided in a hexadecimal numeral system.

2. The apparatus according to claim 1, characterized in that the substrate is substantially planar and has a thickness of at least 1 mm.

3. The apparatus according to claim 1, characterized in that the substrate substantially comprises metal, and whereby said metal has a brushed surface finishing.

4. The apparatus according to claim 1, characterized in that the upper plate has a thickness of at most 1.5 mm.

5. The apparatus according to claim 1, characterized in that the upper plate substantially comprises metal.

6. The apparatus according to claim 1, characterized in that the upper plate comprises at least one positioning aperture, whereby the substrate comprises at least one corresponding positioning indicator and whereby said at least one corresponding positioning indicator is a hump.

7. The apparatus according to claim 1, characterized in that said multitude of indicia are provided in a number of encryption units on the upper plate, whereby the number of encryption units is at least equal to a character length of the at least one cryptographic parameter and whereby each of said number of encryption units comprises at least an equal number of indicia to a number of characters in a writing system of the at least one cryptographic parameter.

8. The apparatus according to claim 7, characterized in that said encryption units are columns and whereby each column comprises at least an equal number of rows, each comprising an indicium, to an amount of characters in a writing system of the at least one cryptographic parameter.

9. The apparatus according to claim 1, characterized in that the indicia of each encryption unit correspond with a random sequence of each of the characters in said writing system and whereby said random sequence is customizable by a user for each encryption unit.

10. Apparatus according to claim 1, configured for storage of a cryptographic parameter of a cryptocurrency network, for storage of a cryptographic key pair of a cryptocurrency network, for storage of a private key of a cryptocurrency network, or for storage of a master seed of a cryptocurrency wallet.

11. The apparatus according to claim 1, wherein the cryptographic parameter is selected from the group consisting of cryptocurrency rights, title rights, probate rights, asset rights, access rights, and mnemonic words.

\* \* \* \* \*